United States Patent [19]

Carpinella et al.

[11] Patent Number: 4,876,782

[45] Date of Patent: Oct. 31, 1989

[54] APPARATUS FOR ATTACHING A GLIDE TO A CHAIR LEG

[75] Inventors: Ralph Carpinella, Middlebury; Karl Becher, New Preston, both of Conn.

[73] Assignee: Carpin Manufacturing, Inc., Waterbury, Conn.

[21] Appl. No.: 233,332

[22] Filed: Aug. 17, 1988

[51] Int. Cl.[4] ............................................ B23P 19/04

[52] U.S. Cl. .......................................... 29/234; 29/252; 29/255; 29/281.3; 29/467; 29/525; 269/34; 269/229; 269/232; 269/233

[58] Field of Search .................. 29/467, 234, 252, 525, 29/281.3, 237, 255; 269/34, 239, 229, 232, 233; 294/115, 116

[56] References Cited

U.S. PATENT DOCUMENTS 2,362,696 11/1944 Hively .................................. 269/34
2,542,676 2/1951 Hunter ................................ 269/139

FOREIGN PATENT DOCUMENTS 495904 of 1931 Fed. Rep. of Germany ...... 269/233

*Primary Examiner*—P. W. Echols
*Assistant Examiner*—K. Jordan
*Attorney, Agent, or Firm*—Chilton, Alix & Van Kirk

[57] ABSTRACT

A fixture engages each leg of a chair leg assembly to support each leg against longitudinal displacement along respective leg axes. A ram and associated drive member are mounted opposite each leg free end so that each ram axis is substantially aligned with one leg axis. A glide is adapted to fit loosely on the leg free end in a first position and to be driven tightly onto the leg in a second position. A pair of cam arms are coupled to the ram so that as the ram advances toward a leg that has a glide in the first position thereon, the cam arms and jaw members at the free ends of the cam arms, pivot toward the leg. The jaw members cooperate to align the leg axis with the ram axis while the glide is in the first position and to support the leg transversely to the leg axis as the ram advances to drive the glide into the second position.

18 Claims, 5 Drawing Sheets

APPARATUS FOR ATTACHING A GLIDE TO A CHAIR LEG

BACKGROUND OF THE INVENTION

The present invention relates to apparatus and method for driving a ram coaxially toward a work piece supported in a stationary position, and more particularly, to apparatus and method for driving a glide or the like into the free end of a chair leg.

Many styles of chair used in cafeterias, schools, and similar institutions, are constructed by joining a molded plastic shell having a seat portion and a back portion, to a leg assembly having a base portion for rigid attachment to the seat and four tubular legs extending from the base portion. Typically, glide members casters or the like are secured to the free ends of the chair legs, usually by an interference friction fit.

Conventionally, such gliders or casters have been installed manually, for example by initially aligning the guide member with the opening at the free end of the leg and tapping it into a first position with the hand or a mallet, and once the member has been aligned, driving it home with the mallet or with an automatic or semi-automatic ram. In any event, such conventional installation of the guides has been performed serially, i.e., one leg at a time, by a single operator.

Thus, conventionally, the installation of glides on chair legs has been very labor intensive and rather slow, due to the care required to align the glider, and the number of separate manual motions required to complete the installation of a single glide.

SUMMARY OF THE INVENTION

One object of the present invention is to automate the installation of a glide or caster into the free end of a chair leg or the like.

It is a more particular object that a plurality of gliders be attached to the chair legs simultaneously.

It is a further object that the work flow involving the positioning of a chair leg assembly for installation of the glides, the actual attachment of the glides, and the removal of the chair leg assembly, be improved relative to known techniques.

These and other objects are accomplished in accordance with the invention, by an apparatus and method for driving a ram coaxially toward a work piece such as a chair leg, by automatically aligning the leg axis with the ram axis to support the leg as the ram advances to drive a part, such as a glider, into the leg.

In its most general form, the apparatus embodiment of the invention includes a drive element such as a pneumatic cylinder, adapted to be mounted in fixed, spaced relation to the leg or workpiece, for selectively advancing and withdrawing the ram over a stroke distance along the ram axis. A pair of cam arms are pivotally connected at one end to the drive element in fixed relation to the ram. Each arm has a free end for movement about the pivot connection along an arcuate path transverse to the ram axis. Each arm also has a side portion defining a cam profile. A cam follower is connected to the ram and engages the cam profiles, for controlling the arcuate movement of the cam arms such that when the ram is advanced the arms pivot towards the ram axis and when the ram is withdrawn, the arms pivot away from the ram axis. A pair of jaw members are carried by the free ends of the cam arms, such that when the cam arms pivot towards each other, the jaw members engage the leg or workpiece as the ram advances. The jaw members cooperate to align the axis of the workpiece with the ram axis and to support the workpiece as the ram advances the full stroke distance toward the workpiece.

In the preferred apparatus embodiment for attaching gliders to chair leg assemblies, the invention further includes a fixture adapted to engage the chair leg assembly remote from the free ends of the legs, for supporting the legs against longitudinal displacement. One drive element and associated ram are mounted at each of four corners above the fixture, in substantial axial alignment with a respective leg. During actuation of the ram, the jaw members guide the leg into precise alignment with a respective ram, so that the glide or the like can be driven home perfectly.

In the preferred method for implementing the invention, the base portion of the leg assembly is positioned on the fixture such that the legs are supported against longitudinal displacement. A glide is positioned on each of a first set of two adjacent legs, and a respective first set of jaw members are moved in conjunction with the advancing rams, to align the first set of legs with the respective advancing rams, whereby the rams drive the glides home. Next, a glide is positioned on each of a second set of two adjacent legs, and a respective second set of jaw members are moved in conjunction with a second set of rams, for aligning the legs on the ram axes so that the second set of rams can drive the other two glides home. In a preferred embodiment, one operator places the chair leg assembly on the fixture and positions the first set of glides on the first set of legs, then actuates the first set of drive members and associated jaws. Then the second operator places the second set of glides on the second set of legs, actuates the drive members for the second set of rams, and then removes the chair assembly with four glides secured thereto, from the fixture.

BRIEF DESCRIPTION OF THE DRAWINGS

These and other objects and advantages of the invention will be described more fully below in connection with the accompanying drawings, in which.

DESCRIPTION OF THE PREFERRED EMBODIMENT

Figure 1:
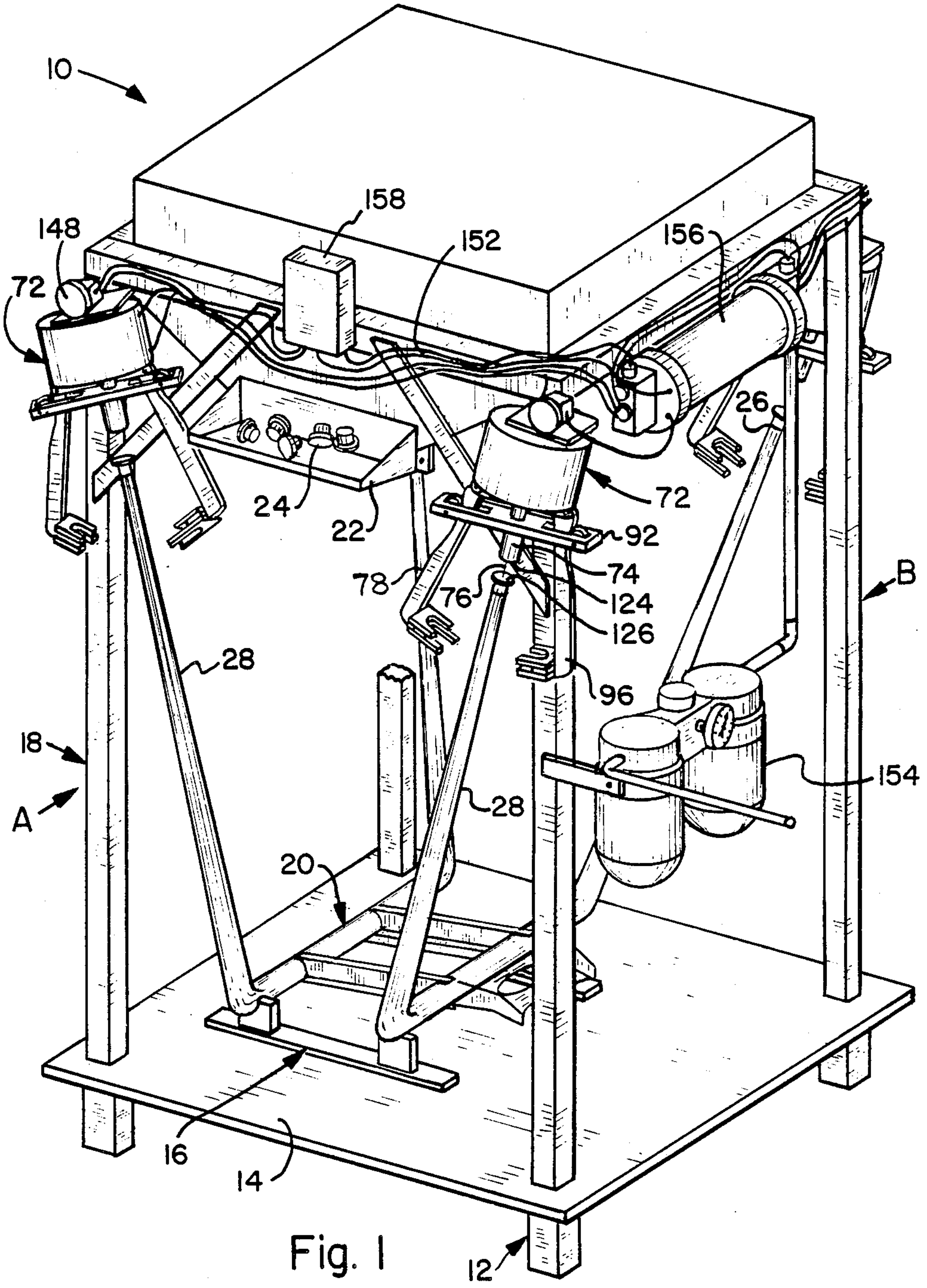
FIG. 1 is a perspective view of a work station in accordance with the preferred embodiment of the invention.

FIG. 1 shows a work station 10 including a base 12 having a table portion 14 to which fixtures 16 are rigidly connected. A frame 18 rigidly is connected directly or indirectly to the base 12, and extends above the table 14 a sufficient height so that a chair leg assembly 20 may be positioned within the frame. The upper portion of the frame preferably includes a bin 22 for holding a plurality of gliders, or casters 24, which are to be attached to the free ends 26 of the four chair legs 28.

Figure 2:
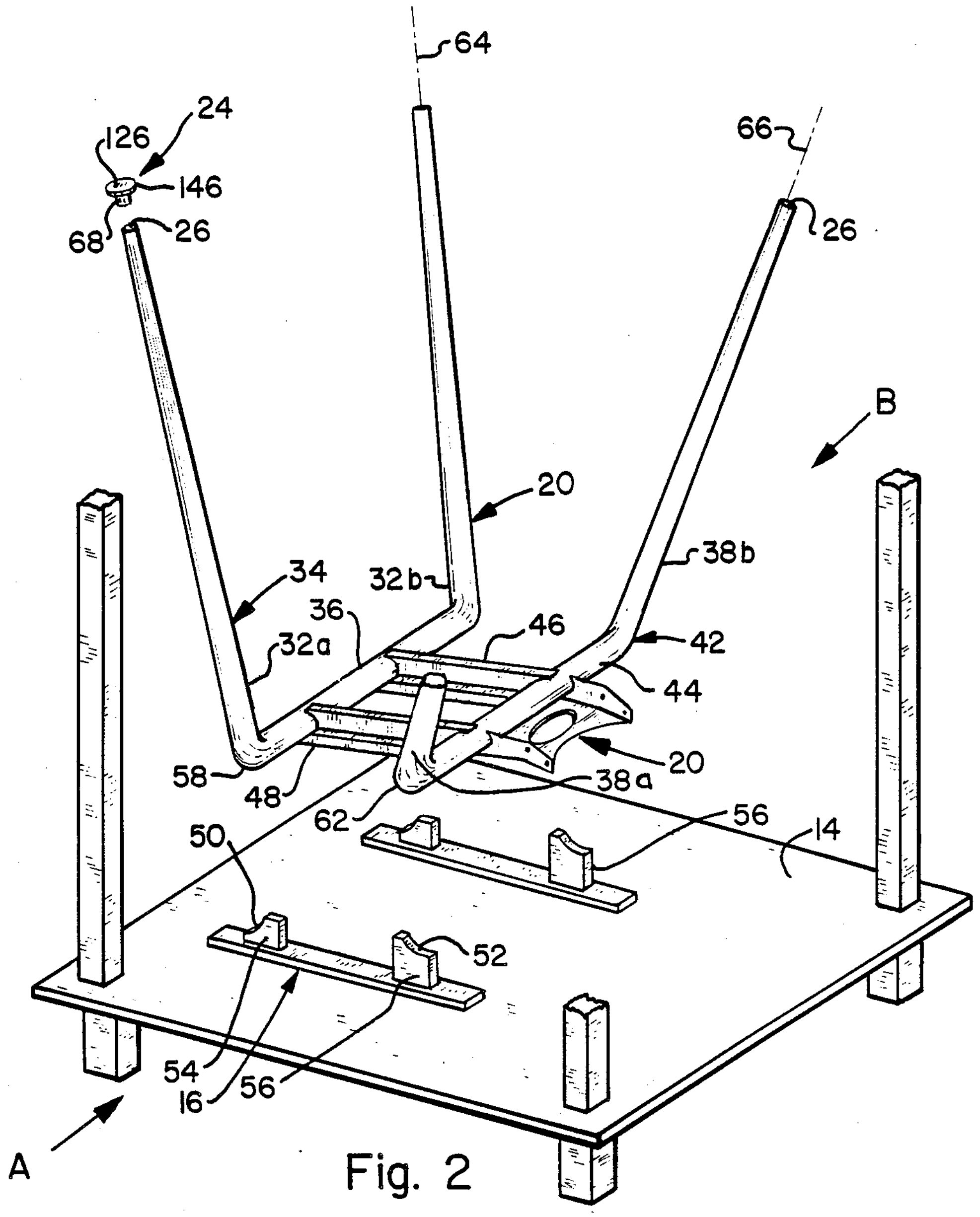
FIG. 2 is a perspective view of the fixture and a chair leg assembly about to be positioned thereon.

FIG. 2 shows the typical configuration of a chair leg assembly 20 as it is about to be positioned on the fixtures 16. The front legs 32*a,b* are typically formed as part of a substantially U-shaped tubular member 34 having two leg portions and an intermediate portion 36. Similarly, the rear legs 38*a,b* are formed as part of a U-shaped member 42 having two legs which extend a shorter distance from the intermediate portion 44, than the extension of the front legs 32 form their respective intermediate portion 36. The intermediate portions 36, 44 of the tubular members 34, 42 are rigidly joined together in parallel by cross braces 46. Bracket members 48 or the like are secured to the intermediate portions 36, 44 or braces 46 opposite the projecting legs 32, 38, to form a base for eventual attachment to the seat portion of a molded shell (not shown), thereby forming a complete chair.

The leg assembly 20 as shown in FIG. 2, is lowered onto the fixture 16, into the position shown in FIG. 1, such that the contours 50, 52 of V-blocks 54, 56 engage the intermediate portions 36, 44 near the bends 58, 62 opposite the free ends 26 of the legs 32, 38 thereby providing substantial support to the legs in the longitudinal direction, i.e., along the respective tubular axes 64, 66 of a projecting legs. Preferably, the V-blocks 56 for supporting the rear legs 38 extend a greater distance above the table 14 than the V-blocks 54 for supporting the front legs 32, such that when the leg assembly 20 is positioned as shown in FIG. 1, the free ends 26 of all four legs lie substantially in a plane parallel to the table top 14.

Typically, the free ends 26 of the legs are substantially cylindrical, and are thus adapted for receiving a glider member 24 in friction fit engagement. The glider member 24 could have either a stem portion 68 for insertion within the tubular free end of a leg, or a cup-like fitting for interference engagement along the outer wall of the tubular end of the leg.

When supported by the fixture 16, the four legs 32, 38 do not necessarily extend precisely vertically, and in most instances would extend somewhat obliquely. As shown in FIG. 1, an automatic drive member 72, preferably in the form of a pneumatic cylinder, is mounted on each corner of the frame 18, in fixed spatial relationship to the V-blocks 54, 56, and oriented so that an associated ram 74 can be advanced and retracted along a ram axis 76. It should be appreciated that the chair legs as shown in FIG. 1 have longitudinal axes 64, 66 that are ideally fixtured to be substantially colinear with the respective ram axes 76, but, due to the normal tolerances associated with the fabrication of the chair assembly 20, such alignment is not likely to be sufficiently precise for the purpose of driving the glide 24 onto the free end 26 of the leg, by the advancing stroke of the ram 74. The drive member 72 of the present invention overcomes this tendency of misalignment.

Figure 3:
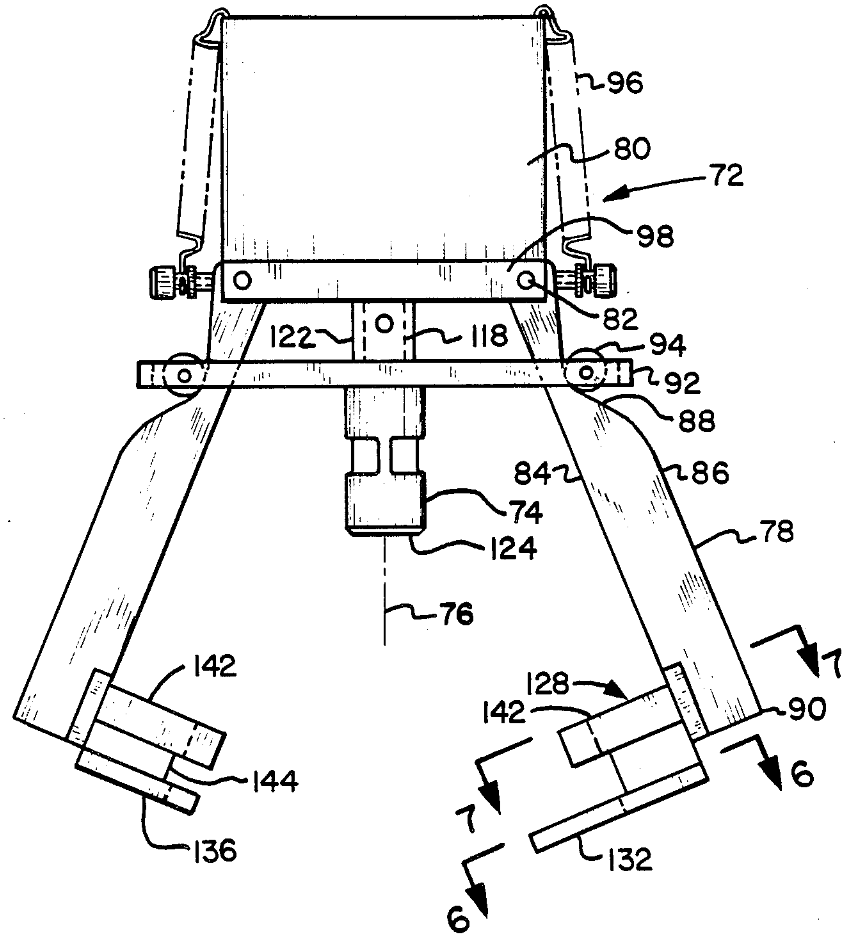
FIG. 3 is an elevation view of the drive element including ram and associated jaw members as mounted at each corner of the work station shown in FIG. 1.

With reference to FIGS. 1 and 3, a pair of cam arms 78 are pivotally connected at one end 82 to the air cylinder housing 80, for movement along arcuate paths transverse to the ram axis 76. Each arm 78 has an inner side 84 facing the ram 74 and an outer side 86 forming a cam profile 88. The cam profile 88 is not pronounced adjacent the pivot connection to the air cylinder housing 80, and engages a cam follower 92 in the form of a roller cam plate which is rigidly connected to the ram 74 for movement therewith in the direction parallel to the ram axis. As the ram 74 is advanced, the cam plate rollers 94 carried by the roller cam plate 92 ride the cam arm profile 88 and force the free ends 90 of the cam arms 78 inwardly toward the ram axis 76. When the ram 74 is retracted, the expansion springs 96 connected between the housing 80 and the cam arms 78, bias the arms outwardly, away from the ram axis.

Figure 4:
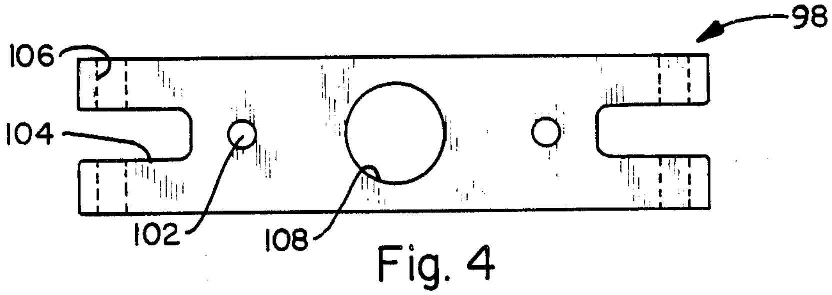
FIG. 4 is a plan view of a mounting strap member of the drive element of FIG. 3.

FIGS. 3 and 4 show the preferred mounting strap 98 which is connected through mounting holes 102 to the cylinder 80 and which includes slide slots 104 and transverse through bores 106, for pivotally mounting the upper end 82 of the cam arms 78. A central aperture 108 is provided for the ram to reciprocate through the mounting strap 98.

Figure 5:
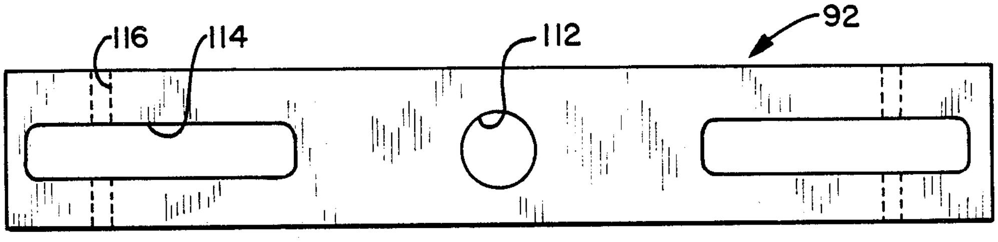
FIG. 5 is a plan view of the cam roller plate of the drive element shown in FIG. 3.

FIGS. 1, 3 and 5 show that the preferred form of the roller cam plate 92, is an elongated plate mounted transversely to the ram axis, having a central aperture 112 for accommodating the ram 74, and two side slots 114 on either side of the central aperture, through which the the cam arms 78 pass freely. Transverse bores 116 are provided for mounting the roller bearings 94 within the slots, for contacting the cam profile. The ram shank 118 penetrates the roller cam plate 92 and is preferably threaded or otherwise adapted to receive a sleeve 122 above the plate 92 and ram head 74 or the like, below the plate 92. The ram head 74 has a contact surface 124 sized to engage the exposed surface 126 of a glider 24, and hexagonal or other profile to facilitate securing the head 74 onto the ram shank 118. The roller cam plate 92 is thus rigidly secured between the ram head 74 and a threaded sleeve 122 or the like, so that the cam plate 92 advances and retracts with the advancing and retracting ram 74.

Figure 6:
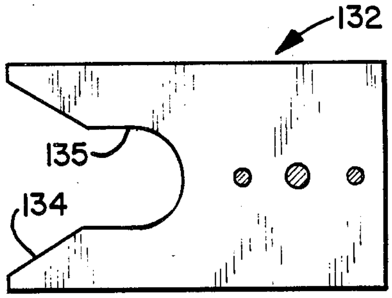
FIG. 6 is a plan view of the alignment jaw of the drive element shown in FIG. 3.

As shown in FIGS. 1 and 3 the longitudinal length of the cam arm 78 from the upper, pivoted end 82 to the lower, free end 90, is preferably longer than the stroke distance of the ram 74 from the retracted to the fully advanced position. Each drive member unit 72 is mounted on the frame such that when the chair assembly 20 is supported in the fixture 16, the free ends 26 of the legs 28 are located between the free ends 90 of the cam arms 78, and the contact surface 124 of the head, when the ram is in the withdrawn position. A pair of jaw members 128 are secured to the respective free ends 90 of the two cam arms 78, oriented toward each other, for engaging the leg 28 intermediate the free end 26 of the leg and the fixture 16, as the ram advances. One of the lower jaws 132, as shown in FIG. 6, includes a notched guide wall 134 for initially contacting the leg as the cam arms move inwardly and a substantially semi-circular seat portion 135.

Figure 7:
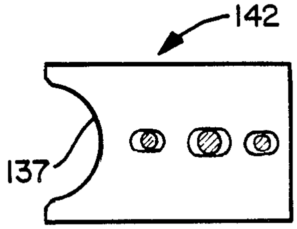
FIG. 7 is a plan view of the support jaw of the drive element shown in FIG. 3.

The other lower mating jaw 136 is shaped as shown in FIG. 7. The guide wall 134 on the lower jaw 132 first contacts a tube leg and then the respective seats 135 engage respective halves of the leg. Upon reaching the fully closed orientation, i.e., when the cam arms are substantially vertical, the guide jaws 132, 136 assure that the leg axis 64 or 66 is aligned with the ram axis 76. Thus, the guide jaws 132, 136 slightly deflect the leg from an initial position which is not likely to be precisely aligned with the ram axis 76, to a final position which is precisely aligned with the ram axis.

The second set of jaws 142 are preferably positioned above the guide jaws 132, 136 and extend toward the ram axis 76 a lesser distance than jaw 132. These support jaws 142 closely surround the leg, preferably adjacent the free end 26, for the purpose of enhancing the rigidity of the leg to resist bending or splitting as the ram 74 drives the glide 24 into the free end. Thus, the guide jaws 132, 136 can be made of Lexan or other lightweight material whereas the support jaws 142 are preferably made of steel. As shown in FIG. 7, the support jaws 142 are contoured at 137 to substantially the same radius of curvature as the outer diameter of the leg at a position along the leg axis adjacent to where the support jaws close to their inner most position. The jaw members 128 may be joined as a subassembly including a filler block 144 between the guide 132 and support jaw 142, with the support jaws 142 rigidly connected to the free end 90 of the cam arm 78.

With reference again to FIGS. 1, 2 and 3, the preferred method will be described for implementing the invention with two operators positioned as shown at A and B. Thus, operator A faces one front leg 32*a* and one rear leg 38*a* of the chair subassembly, and a respective front leg and rear leg drive unit 72 substantially aligned with the legs 32*a* and 38*a*. Operator B faces legs 32*b* and 38*b*. The sequence of events begins with operator A placing the chair leg assembly 20 on the fixture 16, taking one glide 24 in each hand from the glide bin 22 and placing a glide on the free end 26 of a front end rear leg 32*a*, 38*a*. In most instances, each glide can be slid by hand into a first position in the free end 26. The slight friction between the glide fitting or stem portion 68 and leg free end 26, is sufficient for the glide 24 to remain stationary on the leg. The glide pedestal portion 146 may be either rigid with, or connected through a swivel to, the stem portion 68. With the swivel type of glide, the operator need not precisely straighten the pedestal portion 146, but preferrably adjust the pedestal to be approximately straight. Once both glides are in the first position on the respective legs 32*a*, 38*a* the operator A removes his two hands from the legs and pushes with his palms against the actuating buttons 148 mounted on the air cylinder housing 80 or the frame 18 adjacent to the air cylinder. This pressurizes the two cylinders through the air supply lines 152 valves, and regulators 154, 156, 158 so that the ram 74 and associated plate 92 advance. The timing control provided by the interaction of the cam roller plate 92 and the cam arm profile 88 is such that the free ends 26 of the legs 32*a*, 38*a* are coaxially aligned with the ram 74 and the support jaws 142 cradle the leg, just prior to the contact surface 124 of the ram engaging the exposed surface 126 of the glider 24. As the ram 74 continues to the end of the stroke, the glider is driven to the fully seated, second position in the free end of the leg. From the moment the ram head 74 contacts the glider 24 until the glider is fully seated, the lower portion of the cam arm profile 88 is substantially vertical so that the roller 94 on the roller cam plate 92 does not experience substantial resistance.

It should be appreciated, that, in the preferred method, the front leg 32*a* and rear leg 38*a* facing operator A are substantially simultaneously adjusted to their final positions in coaxial alignment with respective rams. The other front and rear legs 32*b*, 38*b* facing operator B are not constrained and thus no significant stresses are imposed between the intermediate portions 36, 44 of the tubular members 34,42 and the cross members 46.

After the glides have been installed on the front and rear legs 32*a*, 38*a* by operator A, the respective rams 74 retract and the cam arms 78 open to the expanded condition shown in FIG. 3. At this time, operator B takes two glides 24 from his bin 22 and places them on the front and rear legs 32*b*, 38*b* facing him and proceeds as previously described with respect to operator A. Once the glides have been fully installed on all four legs, operator B removes the leg assembly 20 with glides affixed thereto from the fixture 16 and operator A places another leg assembly onto the fixture 16 and the foregoing procedure is repeated.

It should be understood that the apparatus and method of the present invention can be implemented in a fully automated system in which either or both of the chair leg assemblies 20 and glides 24 are positioned by machines rather than by human operators.

Figure 8:
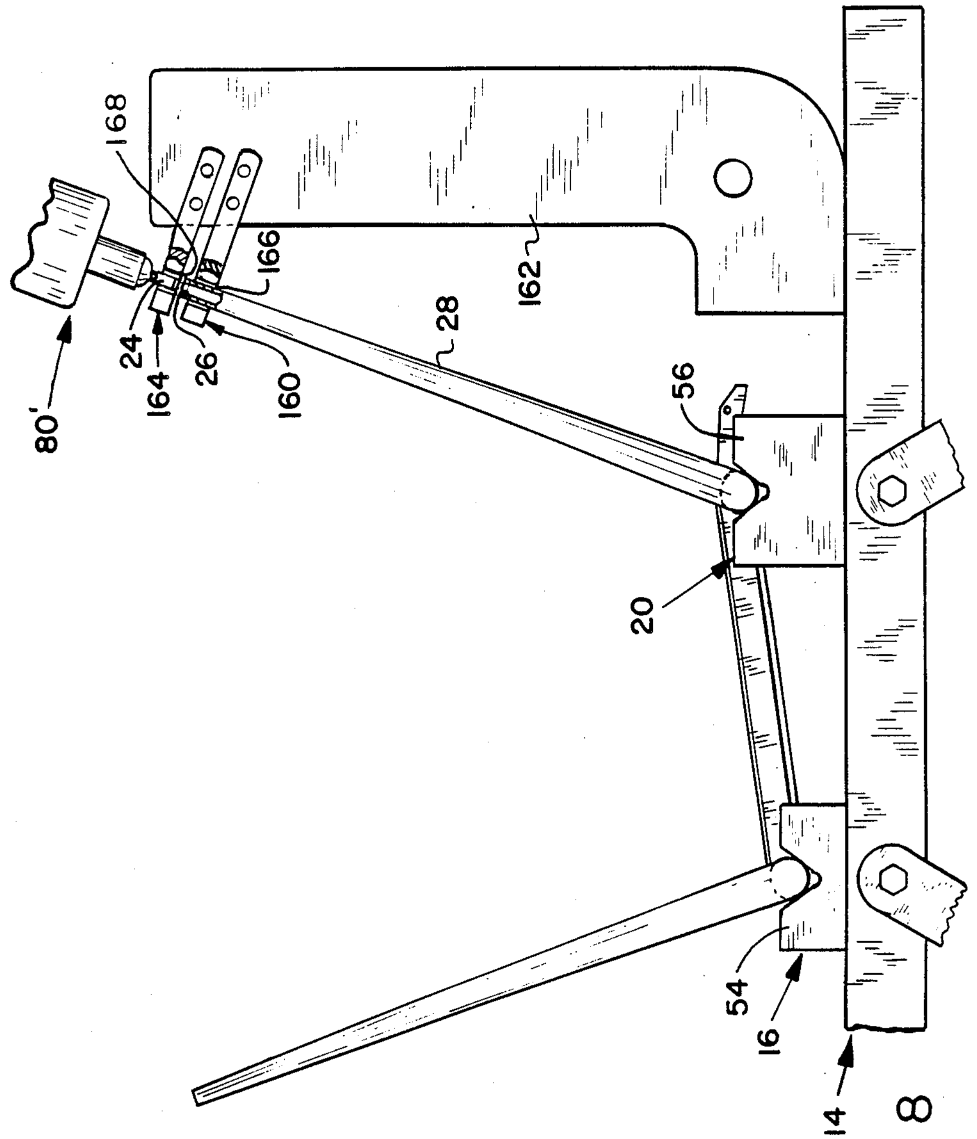
FIG. 8 is an elevation view of an alternative embodiment of the invention.

FIG. 8 shows an alternative embodiment of the invention, wherein the work table 14, fixture I6, and leg assembly 20 are substantially as, previously described. In this embodiment, the air cylinder 80′ and a leg jaw member 160 for aligning and supporting a chair leg 28, are carried by a pivotable post 162, rather than being fixed to a stationary frame. The post 162 further carries a glide loading jaw member 164 intermediate the leg jaw member 160 and the air cylinder 80′.

The leg jaw member 160 is fixed to, and angled obliquely from, the post 162, and has an aperture 166 that is located so that the leg passes relatively through the aperture. Preferably, the aperture size is controlled by actuation means so that after placement about the leg, the aperture contracts and contacts the leg outer diameter. This achieves alignment of the leg and provides some transverse support when the glide 24 is driven into the free end 26 of the leg.

The glide jaw member 164 is similarly fixed to the swinging post 162, substantially parallel to the leg jaw 160, and has a controlled glide aperture 168. The aperture 168 on the glide jaw is preferably spring loaded so that an operator can insert a portion of a glide 24 for friction retention in the aperture.

In this embodiment of the invention, the range of diametral opening in the apertures is large enough that the leg assembly can easily be loaded onto the V-block supports 54, 56. The V-blocks are staggered vertically so that the front and rear legs of the chair assemebly make substantially equal angles to the vertical. Two operators facing each other, each load two glides or casters into two glide jaw apertures. The operators then cause the leg jaw members 160 to align and stabilize the legs. With the glide jaw apertures 168 in line with the leg jaw apertures 166, and the glides 24 in coaxial alignment with the free ends 26 of the legs, the air cylinders 80′ are then actuated to drive the glides through the resilient walls of the glide jaw apertures 168, and into a permanent friction fit engagement with the chair leg free end 26.

Preferably, the diameter of the jaw apertures 166 is determined by a separate source of air pressure (not shown) such that after the glide 24 is driven into the leg free end, both apertures can be opened to a diameter that is larger than the greatest diameter of the glide, so that both jaws can pass over the attached glide. The leg assembly can then be removed and another positioned on the fixture for subsequent attachment of the glides.

We claim:

1. Apparatus for driving a glide into the free end of a chair leg that has a longitudinal axis, comprising:

means for holding a supply of glides, each glide being adapted to fit loosely on the free end of the leg in a first position and to be driven tightly onto the leg in a second position;

fixture means for engaging the leg remote from the free end of the leg, to support the leg against longitudinal displacement;

drive means mounted in fixed relation to the fixture means and in spaced relation to the free end of the leg, the drive means including means for selectively advancing and withdrawing a ram along a ram axis toward and away from the leg over a known stroke distance;

a pair of cam arms pivotally connected at one end to said drive means independently of the ram, for movement along arcuate paths transverse to the ram axis, each arm having a free end and a portion defining a cam profile between the pivoted and free ends;

cam follower means connected to move with the ram and engaging the cam profiles, for controlling the arcuate movement of the cam arms such that when the ram is advanced the arm free ends pivot toward each other; and jaw means carried by the respective free ends of the pair of cam arms and oriented toward each other, for engaging the leg near the free end thereof as the ram advances, whereby the jaw means cooperate to align the leg axis with the ram axis while the glide is in the first position and to support the leg transversely to the leg axis as the ram advances along the known stroke distance to drive the glide into the second position.

2. The combination of a chair and an apparatus for driving glides into the free ends of a plurality of legs on the chair, each leg having a longitudinal axis, comprising:

means for holding a supply of glides, each glide being adapted to fit loosely on the free end of the leg in a first position and to be driven tightly onto the leg in a second position;

fixture means for engaging the leg remote from the free end of the leg, to support the leg against longitudinal displacement;

drive means mounted in fixed relation to the fixture means and in spaced relation to the free end of the leg, the drive means including means for selectively advancing and withdrawing a ram along a ram axis toward and away from the leg over a known stroke distance;

a pair of cam arms pivotally connected at one end to said drive means independently of the ram, for movement along arcuate paths transverse to the ram axis, each arm having a free end and a portion defining a cam profile between the pivoted and free ends;

cam follower means connected to move with the ram and engaging the cam profiles, for controlling the arcuate movement of the cam arms such that when the ram is advanced the arm free ends pivot toward each other; and jaw means carried by the respective free ends of the pair of cam arms and oriented toward each other, for engaging the leg near the free end thereof as the ram advances, whereby the jaw means cooperate to align the leg axis with the ram axis while the glide is in the first position and to support the leg transversely to the leg axis as the ram advances along the known stroke distance to drive the glide into the second position;

said plurality of chair legs being connected together opposite the leg free ends, and the fixture means including a plurality of V-blocks for cradling the legs in the vicinity of their connection together.

3. The apparatus of claim 2 wherein, a front chair leg member has a substantially U shape and a rear chair leg member has a substantially U shape, the elongated leg portions of the front member being longer than the elongated leg portions of the rear member and the front and rear members being connected together such that the intermediate portions between the elongated leg portions are rigidly supported in parallel; and the v-blocks include a front set for cradling the intermediate portion of the front member and a rear set for cradling the intermediate portion of the rear member, the front and rear v-blocks being of different height such that the free ends of all chair legs are at substantially the same elevation when the front and rear leg members are supported in the fixture means.

4. The apparatus of claim 1 including, a base having a table portion to which the fixture means is rigidly connected, a frame rigidly connected to the base and extending above the table portion, and wherein said drive means is rigidly mounted on the frame.

5. The apparatus of claim 1, wherein the cam arms are connected to the drive means symmetrically on either side of the ram, such that each cam arm has a surface facing the ram and a surface facing away from the ram, and each cam profile is formed on a respective cam surface that faces away from the ram.

6. The apparatus of claim 1, wherein the cam follower is an elongated plate having a central opening for engaging the ram and two cam slots oppositely located with respect to the opening, each cam slot having means for engaging the cam profile of a cam arm to control the arcuate movement of the cam arms.

7. The apparatus of claim 1, wherein the jaw means includes a pair of guide jaws for contacting the leg and guiding the leg toward the ram axis, and a pair of support jaws for supporting the leg transversely to the leg axis as the ram drives the glide member into the second position.

8. The apparatus of claim 1, including means for biasing the free ends of the cam arms away from the ram axis.

9. The apparatus of claim 1, wherein the cam arms have a length from the pivot connection to the jaw means, that is greater than the ram stroke distance.

10. The apparatus of claim 1, including actuation means mounted on the frame adjacent a respective drive means, for manually initiating the advance of the ram toward the leg.

11. The apparatus of claim 4, wherein the frame has four corners and each corner has one of said drive means mounted thereon such that the ram for each drive means is positioned for substantial coaxial alignment with a respective one of each leg of a chair having four legs to be supported by said fixture means.

12. Apparatus for driving a ram along a ram axis toward a work piece supported in a stationary position and having a work piece axis, comprising:

drive means adapted to be mounted in fixed, spaced relation to the work piece, for selectively advancing and withdrawing the ram over a stroke distance along the ram axis;

a pair of cam arms pivotally connected at one end to said drive means independently of the ram, each arm having a free end for movement along an arcuate path transverse to the ram axis, and a side portion defining a cam profile;

cam follower means connected to move with the ram and engaging the profiles of the cam arms, for controlling the arcuate movement of the cam arms such that when the ram is advanced the arms pivot toward the ram axis; and jaw means carried by the respective free ends of the cam arms and oriented toward each other, for engaging respective portions of the work piece as the ram advances, whereby the jaw means cooperate to align the axis of the work piece with the ram axis and to support the work piece as the ram advances over the stroke distance toward the work piece.

13. The apparatus of claim 12, wherein the cam arms are connected to the drive means symmetrically on either side of the ram, such that each cam arm has a side surface facing the ram and a side surface facing away from the ram, and each cam profile is formed on a respective cam surface that faces away from the ram.

14. The apparatus of claim 12, wherein the cam follower is an elongated plate having a central opening for engaging the ram and two cam slots oppositely located with respect to the opening, each cam slot having means for engaging the cam profile of a cam arm to control the arcuate movement of the cam arms.

15. The apparatus of claim 12, wherein the jaw means include guide members for contacting the work piece and guiding the work piece toward the ram axis, and support members for supporting the work piece transversely to the work piece axis as the ram advances toward the work piece.

16. The apparatus of claim 12, including means for biasing the free ends of the cam arms away from the ram axis.

17. The apparatus of claim 12, wherein the cam arms have a length from the pivot connection to the jaw means, that is greater than the ram stroke distance.

18. Apparatus for driving a glide into the free end of a chair leg that has a longitudinal axis, comprising:

fixture means for engaging the chair leg remote from the free end of the leg, to support the leg against longitudinal displacement of the leg;

a post member adjacent the fixture means, pivotally mounted to swing toward and away from the free end of the leg;

a leg jaw member carried by the post and including a leg aperture adapted to surround the free end of the supported leg;

a glide jaw member carried by the post and including a glide aperture in coaxial alignment with said leg aperture, said glide aperture including means for retaining a glide member in the glide aperture;

drive means including a ram coaxially aligned with said leg and glide apertures, for driving a glide that is retained in said glide aperture, through said glide aperture into substantially permanent friction fit engagement with said leg free end; and means for separating said leg jaw members and said glide jaw members from said leg and said glide respectively.

* * * * *